United States Patent
Takada et al.

(10) Patent No.: US 8,766,591 B2
(45) Date of Patent: Jul. 1, 2014

(54) RESONANCE TYPE NON-CONTACT CHARGING APPARATUS

(75) Inventors: Kazuyoshi Takada, Kariya (JP); Sadanori Suzuki, Kariya (JP); Kenichi Nakata, Kariya (JP); Shimpei Sakoda, Kariya (JP); Yukihiro Yamamoto, Kariya (JP); Shinji Ichikawa, Toyota (JP); Tetsuhiro Ishikawa, Toyota (JP)

(73) Assignees: Kabushiki Kaisha Toyota Jidoshokki (JP); Toyota Jidosha Kabushiki Kaisha (JP)

(*) Notice: Subject to any disclaimer, the term of this patent is extended or adjusted under 35 U.S.C. 154(b) by 420 days.

(21) Appl. No.: 12/646,305

(22) Filed: Dec. 23, 2009

(65) Prior Publication Data

US 2010/0156346 A1 Jun. 24, 2010

(30) Foreign Application Priority Data

Dec. 24, 2008 (JP) .................. 2008-328831

(51) Int. Cl.
*H02J 7/00* (2006.01)
(52) U.S. Cl.
USPC .......................... 320/108; 320/109
(58) Field of Classification Search
USPC ........................................ 320/108
See application file for complete search history.

(56) References Cited

U.S. PATENT DOCUMENTS

| | | | | |
|---|---|---|---|---|
| 4,303,902 A * | 12/1981 | Lesster et al. | | 336/83 |
| 5,012,212 A * | 4/1991 | Matsui et al. | | 333/227 |
| 5,069,928 A * | 12/1991 | Echizen et al. | | 427/575 |
| 5,654,621 A * | 8/1997 | Seelig | | 320/108 |
| 5,710,502 A * | 1/1998 | Poumey | | 320/108 |
| 6,028,413 A * | 2/2000 | Brockmann | | 320/108 |
| 7,071,776 B2 * | 7/2006 | Forrester et al. | | 330/129 |
| 7,605,496 B2 * | 10/2009 | Stevens et al. | | 307/17 |
| 8,030,887 B2 * | 10/2011 | Jung | | 320/108 |
| 8,073,646 B2 * | 12/2011 | Sato | | 702/106 |
| 2002/0040233 A1 * | 4/2002 | George et al. | | 607/2 |
| 2006/0071632 A1 * | 4/2006 | Ghabra et al. | | 320/108 |
| 2007/0222542 A1 | 9/2007 | Joannopoulos et al. | | |
| 2008/0094027 A1 * | 4/2008 | Cho | | 320/108 |
| 2008/0150527 A1 * | 6/2008 | Hasegawa et al. | | 324/307 |
| 2008/0156632 A1 * | 7/2008 | Van Zyl | | 204/164 |
| 2008/0191645 A1 * | 8/2008 | Aoi et al. | | 315/505 |
| 2008/0278264 A1 | 11/2008 | Karalis et al. | | |
| 2009/0001929 A1 * | 1/2009 | Posamentier | | 320/108 |
| 2009/0001932 A1 * | 1/2009 | Kamijo et al. | | 320/108 |
| 2009/0033280 A1 * | 2/2009 | Choi et al. | | 320/108 |
| 2009/0315512 A1 * | 12/2009 | Ichikawa et al. | | 320/109 |

FOREIGN PATENT DOCUMENTS

| | | |
|---|---|---|
| JP | 2007-267578 | 10/2007 |
| JP | 2010-068634 | 3/2010 |
| WO | 2007008646 A2 | 1/2007 |
| WO | 2008118178 A1 | 10/2008 |
| WO | 2009054221 A1 | 4/2009 |

* cited by examiner

Primary Examiner — Arun Williams
(74) Attorney, Agent, or Firm — Baker & Hostetler LLP

(57) ABSTRACT

A resonance type non-contact charging apparatus is disclosed. A charger of the apparatus receives the high frequency power from a secondary side resonance coil of the apparatus. A power ratio detecting section of the apparatus detects the ratio of the reflected power from a primary side resonance coil to the high frequency power source with respect to the output power from the high frequency power source to the primary side resonance coil. A stop control section of the apparatus stops the high frequency power source when the ratio detected by the power ratio detecting section becomes greater than or equal to a predetermined threshold value.

5 Claims, 6 Drawing Sheets

RESONANCE TYPE NON-CONTACT CHARGING APPARATUS

CROSS REFERENCE TO RELATED APPLICATION

This application claims priority to Japanese Application No. 2008-328831 filed Dec. 24, 2008.

BACKGROUND

The present invention relates to a resonance type non-contact charging apparatus.

For example, International Patent Publication No. WO/2007/008646 discloses a resonance type power transmission system that transmits power wirelessly from a primary side resonance coil at a transmission side to a secondary side resonance coil at a reception side, which is arranged separated from the primary side resonance coil. Specifically, in the power transmission system, when the primary side resonance coil produces an AC electric field from AC voltage supplied by a high frequency power source, an oscillating magnetic field is generated in the proximity of the primary side resonance coil. The power is then transmitted from the primary side resonance coil to the secondary side resonance coil through resonance.

However, if there is an object between the primary side resonance coil and the secondary side resonance coil, some or all of the power transmitted from the primary side resonance coil to the secondary side resonance coil is reflected to the high frequency power source, thus possibly damaging the high frequency power source.

SUMMARY

Accordingly, it is an objective of the present invention to provide a resonance type non-contact charging apparatus that prevents a high frequency power source from being damaged by reflected electric power.

To achieve the foregoing objective and in accordance with one aspect of the present invention, a resonance type non-contact charging apparatus including a high frequency power source, a primary side resonance coil, a secondary side resonance coil, a charger, a power ratio detecting section, and a stop control section is provided. The primary side resonance coil receives a high frequency power from the high frequency power source. The secondary side resonance coil is arranged separated from and in a non-contact manner with respect to the primary side resonance coil. The secondary side resonance coil receives a power from the primary side resonance coil through magnetic field resonance between the primary side resonance coil and the secondary side resonance coil. The charger receives the high frequency power from the secondary side resonance coil. The power ratio detecting section detects a ratio of a reflected power from the primary side resonance coil to the high frequency power source with respect to an output power from the high frequency power source to the primary side resonance coil. The stop control section stops the high frequency power source when the ratio detected by the power ratio detecting section becomes greater than or equal to a predetermined threshold value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF ILLUSTRATIVE EMBODIMENTS

A resonance type non-contact charging apparatus according to one embodiment of the present invention will now be described with reference to FIGS. 1 to 6.

Figure 1:
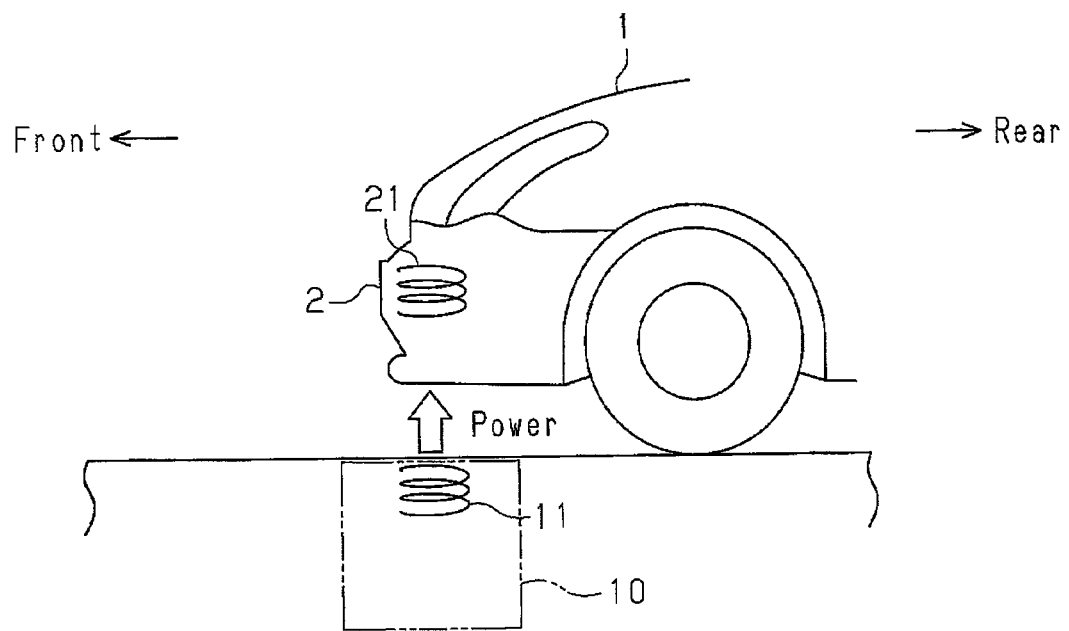
FIG. 1 is a diagram schematically showing the configuration of a vehicle employing a resonance type noncontact charging apparatus according to one embodiment of the present invention.

The resonance type non-contact charging apparatus of the present embodiment is employed in a charging system for a battery mounted in a hybrid vehicle, which is a charging apparatus for charging the battery of the hybrid vehicle. As illustrated in FIG. 1, a secondary side resonance coil 21 is mounted in a front surface portion of a body frame of a vehicle 1, that is, for example, the interior of a front bumper of the vehicle 1. The secondary side resonance coil 21 is formed by a copper wire wound in a helical shape. The secondary side resonance coil 21 is arranged in the front bumper in such a manner that the axis of (the helical shape of) the secondary side resonance coil 21 corresponds to the front-and-rear direction of the vehicle 1.

A ground side unit 10 is embedded in the floor of a charging station, where a battery 25 of the vehicle 1 is charged. The ground side unit 10 has a primary side resonance coil 11. The primary side resonance coil 11 is formed by a copper wire wound in a helical shape. The primary side resonance coil 11 is arranged in such a manner that the axis of (the helical shape of) the primary side resonance coil 11 extends perpendicularly to the ground surface. When the battery 25 of the vehicle 1 is charged at the charging station, the vehicle 1 is arranged in the charging station in such a manner that the axis of (the helical shape of) the primary side resonance coil 11 and the axis of (the helical shape of) the secondary side resonance coil 21 coincide with each other or are located close to each other.

Figure 2:
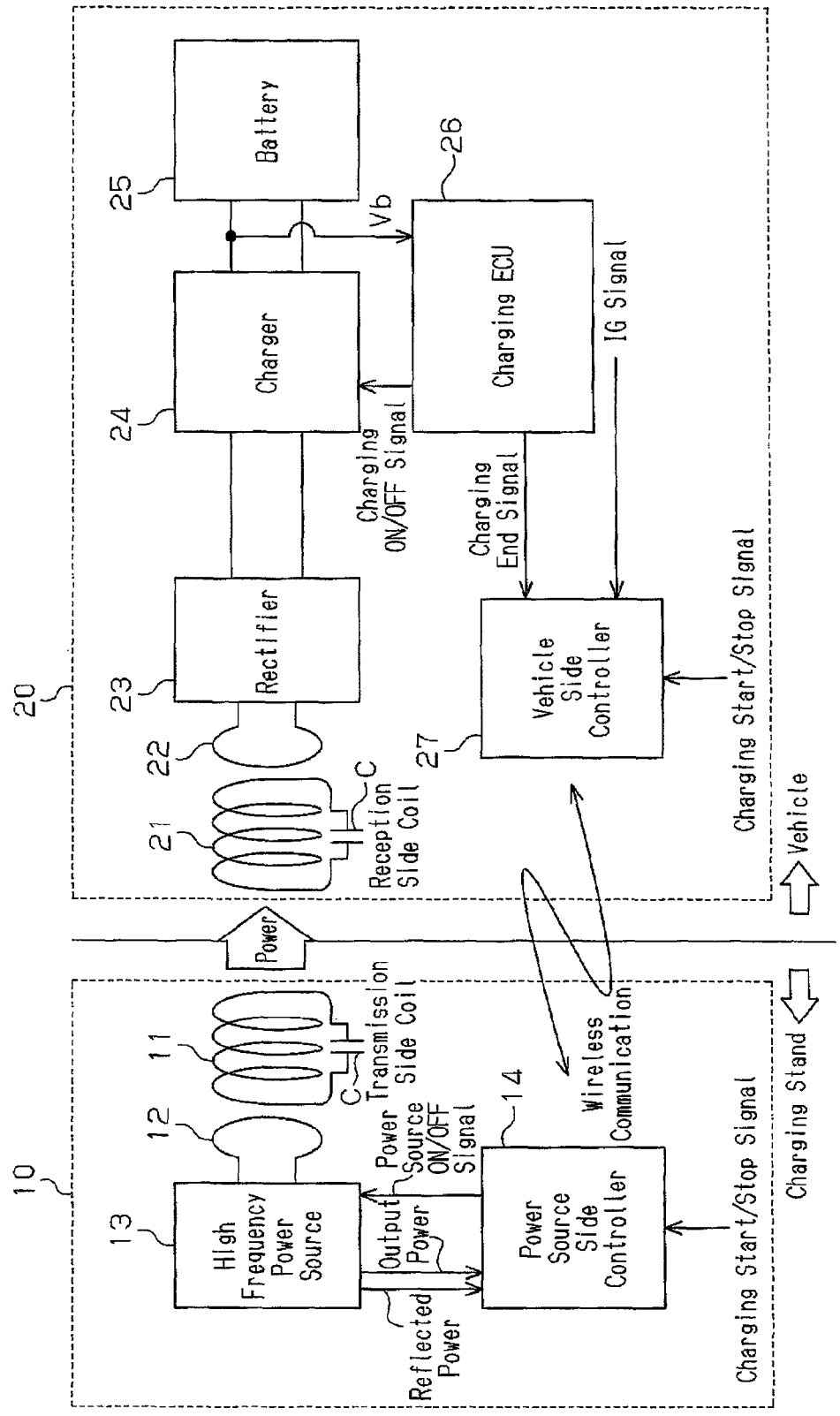
FIG. 2 is a circuit diagram illustrating the electric configuration of the resonance type non-contact charging apparatus shown in FIG. 1.

FIG. 2 shows the configuration of the entire resonance type non-contact charging apparatus. The ground side unit 10 has the primary side resonance coil 11, a primary coil 12, a high frequency power source (an AC power source) 13, and a power source side controller 14. A vehicle side unit 20 is mounted in the vehicle 1. The vehicle side unit 20 has the secondary side resonance coil 21, a secondary coil 22, a rectifier 23, a charger 24, and the battery 25, which is a secondary cell, a charging ECU 26, and a vehicle side controller 27.

The high frequency power source 13 outputs high frequency power of, for example, approximately several MHz. The primary coil 12 is connected to the high frequency power source 13. When the high frequency power source 13 supplies high frequency power to the primary coil 12, the primary side resonance coil 11 is coupled to the primary coil 12 through electromagnetic induction. This causes the primary coil 12 to transmit the power to the primary side resonance coil 11. In this manner, the primary side resonance coil 11 receives the high frequency power from the high frequency power source 13 through the primary coil 12. In other words, high frequency wave is supplied from the high frequency power source 13 to the primary side resonance coil 11 through the primary coil 12. A capacitor C is connected to the primary side resonance coil 11.

The power source side controller 14 is connected to the high frequency power source 13. The power source side controller 14 provides a power source ON/OFF signal to the high frequency power source 13 so as to selectively turn on and off the high frequency power source 13. In the high frequency power source 13, output power PI, which is supplied 23 from the high frequency power source 13 to the primary side resonance coil 11, is measured and the measured output power is provided to the power source side controller 14. Also in the high frequency power source 13, reflected power P2, which is reflected from the primary side resonance coil 11 to the high frequency power source 13, is measured and the measured reflected power is provided to the power source side controller 14. The power source side controller 14 generates a charging start/stop signal. The charging start/stop signal is generated in response to switching manipulation by an operator at the ground side for selectively starting and stopping charging.

The secondary side resonance coil 21 is arranged in a non-contact manner with respect to and separated from the primary side resonance coil 11. The secondary side resonance coil 21 receives the high frequency power from the primary side resonance coil 11 through magnetic field resonance of the primary and secondary side resonance coils 11, 21. The secondary coil 22 is coupled to the secondary side resonance coil 21 through electromagnetic induction. This causes the secondary side resonance coil 21 to transmit the power to the secondary coil 22. The rectifier 23 is connected to the secondary coil 22. The rectifier 23 rectifies the power received by the secondary coil 22. The capacitor C is connected to the secondary side resonance coil 21.

The charger 24 is connected to the rectifier 23. The charger 24 boosts the power that has been rectified by the rectifier 23. The charger 24 has a switching element. By controlling the ON/OFF state of the switching element, the output voltage and the output electric current of the charger 24 are regulated. The battery 25 is connected to the charger 24 and the power output by the charger 24 charges the battery 25.

The charging ECU 26 is connected to the charger 24. When the battery 25 is charged, the charging ECU 26 controls the switching element of the charger 24 while monitoring the output voltage and the output electric current of the charger 24. When a charging ON/OFF signal is sent from the charging ECU 26 to the charger 24, the charger 24 is correspondingly turned on or off in response to the signal. Also, the charging ECU 26 detects a battery voltage Vb, which is the input voltage of the battery 25. The vehicle side controller 27 is connected to the charging ECU 26. The charging ECU 26 sends a charging end signal to the vehicle side controller 27.

The vehicle side controller 27 also receives an ignition signal and the charging start/stop signal. The ignition signal is a manipulation signal of the ignition switch of the vehicle 1. The charging start/stop signal is generated in response to switching operation by the operator for selectively starting and stopping charging.

The power source side controller 14 of the ground side unit 10 and the vehicle side controller 27 of the vehicle side unit 20 are wirelessly communicable with each other.

Figure 3:
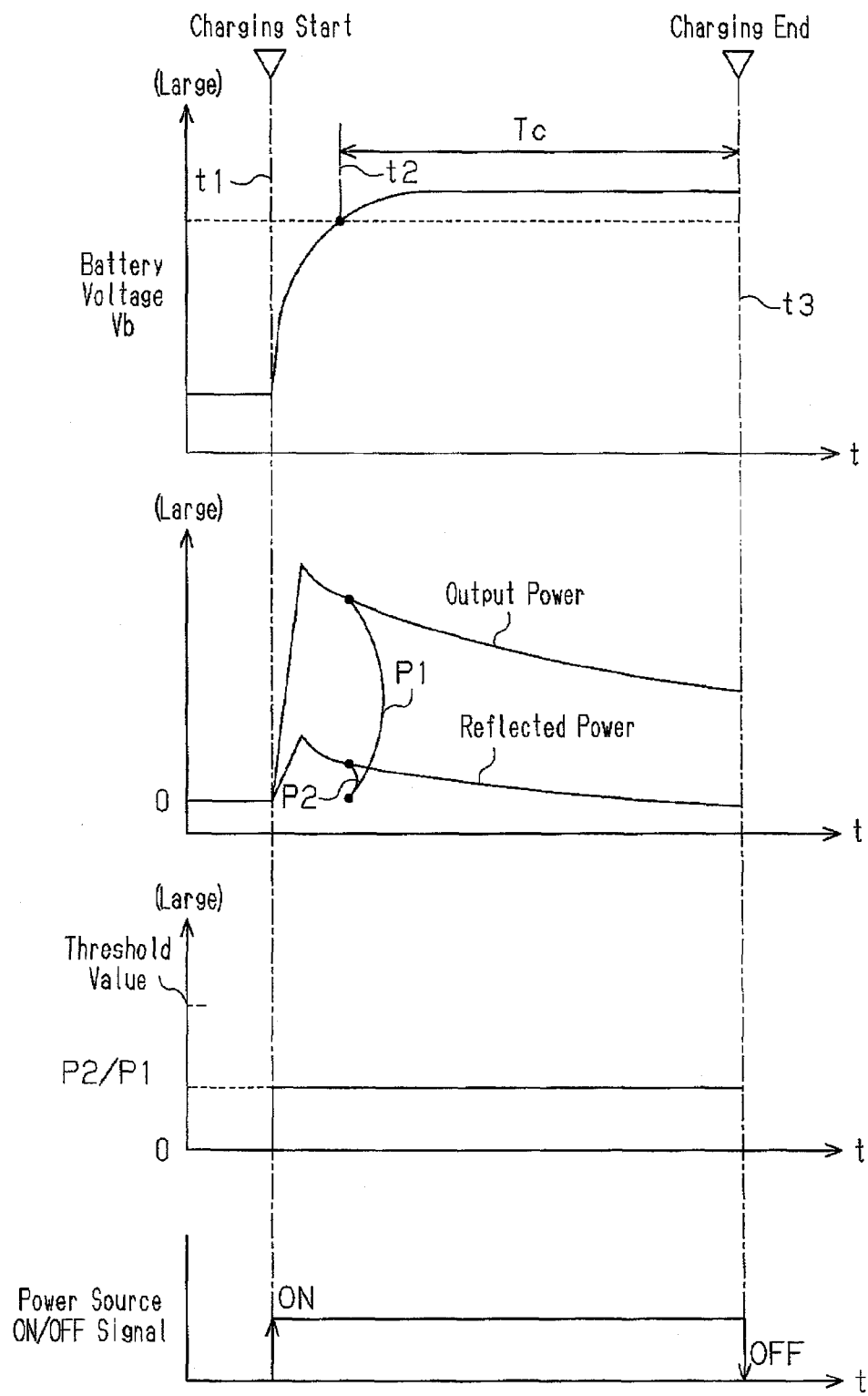
FIG. 3 is a timing chart illustrating the operation of the resonance type non-contact charging apparatus shown in FIG. 1.

Operation of the resonance type non-contact charging apparatus, which has the above-described configuration, will be explained with reference to the timing chart of FIG. 3. FIG. 3 is a timing chart of a case in which there is no object between the primary side resonance coil 11 and the secondary side resonance coil 21, or in other words, of a case in which the power is normally transmitted from the ground side unit 10 to the vehicle side unit 20.

In FIG. 3, at the time point t1, an operator on the ground side or an occupant of the vehicle 1 turns on a charging start switch. This sends a charging start signal to the power source side controller 14 or the vehicle side controller 27. The power source side controller 14 and the vehicle side controller 27 share the information about activation of the charging start switch through wireless communication. The power source side controller 14 outputs a power source ON/OFF signal of the high level to the high frequency power source 13. That is, the power source side controller 14 outputs a power source ON command to the high frequency power source 13. The vehicle side controller 27 sends a charging start command to the charging ECU 26. This causes the charging ECU 26 to output a charging ON/OFF signal of the high level to the charger 24. In other words, the charging ECU 26 provides a charging ON command to the charger 24.

This causes the charger 24 to start charging, and the battery voltage Vb rises. When the battery voltage Mb reaches a predetermined threshold value (at the time point t2 in FIG. 3), the charging ECU 26 starts time measurement. After the battery voltage Vb has reached the threshold value and a predetermined charging time Tc has elapsed (at the time point t3 in FIG. 3), the charging ECU 26 determines that the battery 25 is now completely charged and provides a charging end signal to the vehicle side controller 27.

In response to the charging end signal from the charging ECU 26, the vehicle side controller 27 wirelessly informs the power source side controller 14 of completion of charging. This causes the power source side controller 14 to output a power source ON/OFF signal of the low level to the high frequency bower source 13. In other words, the power source side controller 14 outputs a power source OFF command to the high frequency power source 13. This turns off the high frequency power source 13.

After a predetermined charging time Tc has elapsed (at the time point t3 in FIG. 3), the charging ECU 26 sends a charging ON/OFF signal of the low level to the charger 24. In other words, the charging ECU 26 provides a charging OFF command to the charger 24. This turns off the charger 24.

Figure 4:
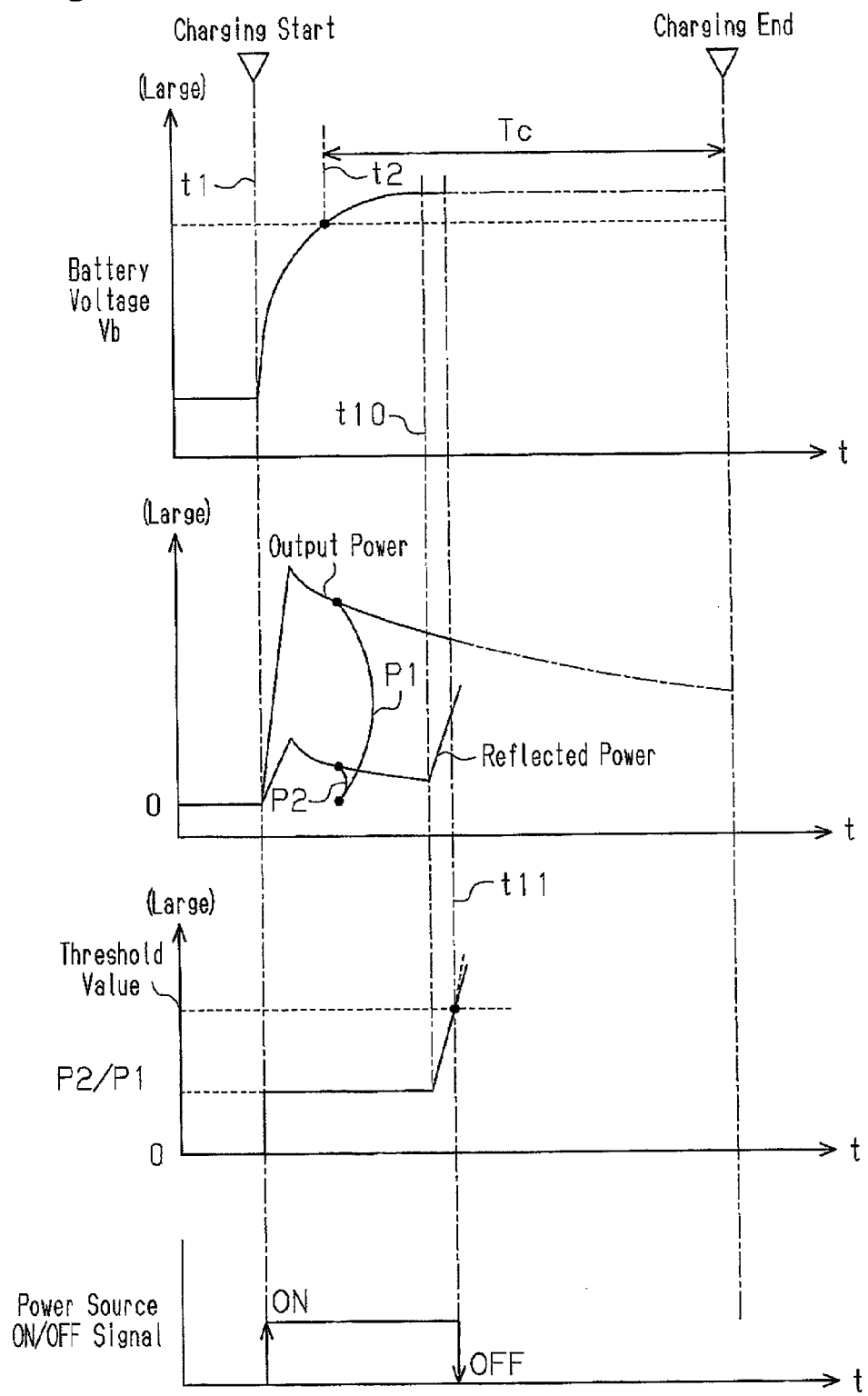
FIG. 4 is a timing chart illustrating the operation of the resonance type non-contact charging apparatus shown in FIG. 1.
Figure 5:
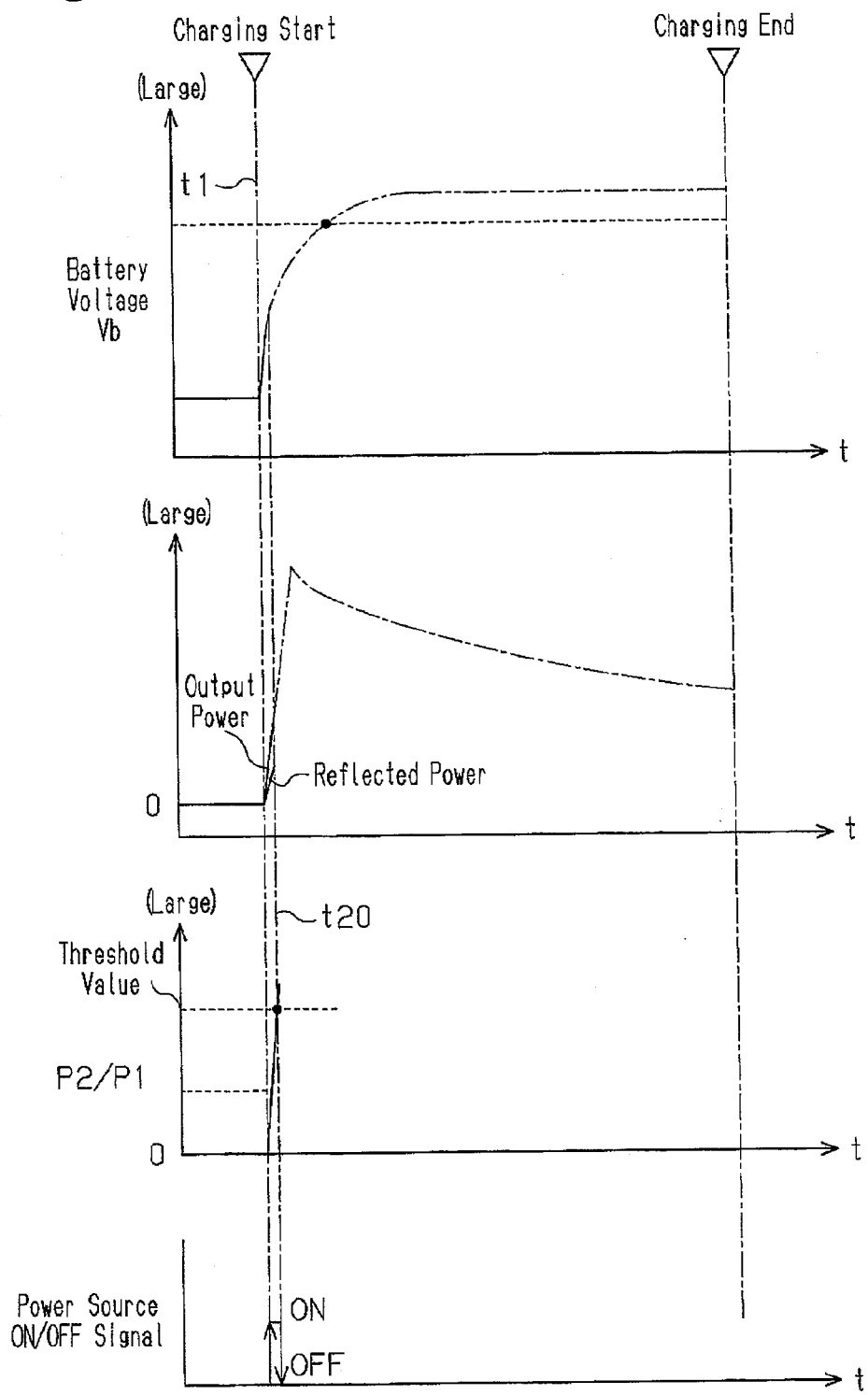
FIG. 5 is a timing chart illustrating the operation of the resonance type non-contact charging apparatus shown in FIG. 1.
Figure 6:
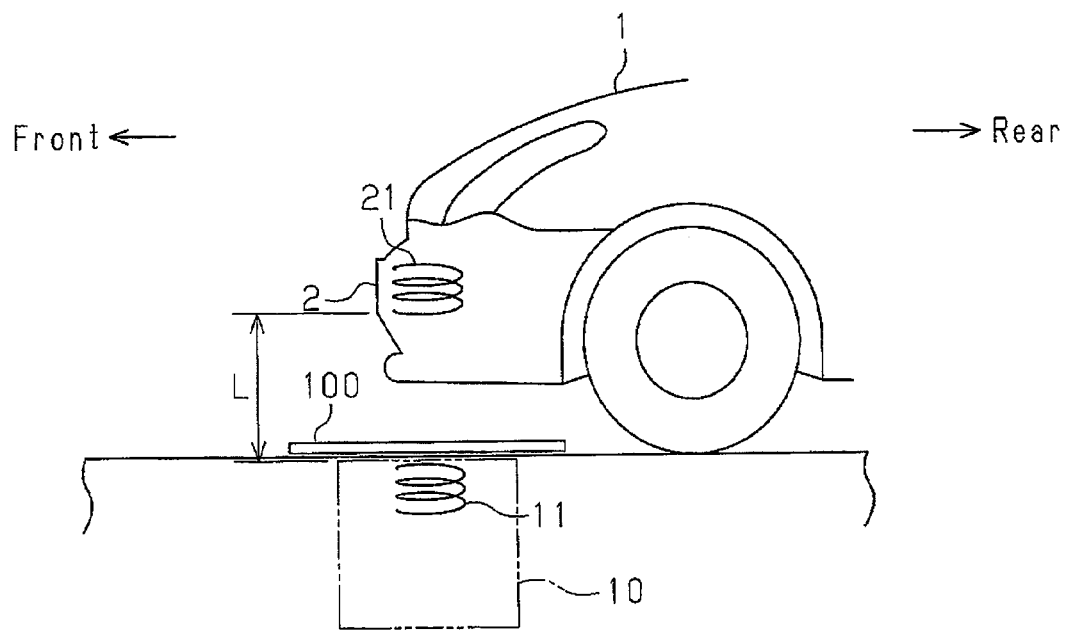
FIG. 6 is a diagram showing the primary side resonance coil and the secondary side resonance coil of the resonance type non-contact charging apparatus shown in FIG. 1, with an obstacle located between the primary and secondary side resonance coils.

FIGS. 4 and 5 are timing charts each in an abnormal state in which an object 100 (which is, for example, a steel plate) is located between the primary side resonance coil 11 and the secondary side resonance coil 21, as illustrated in FIG. 6, and thus blocks transmission of the power from the ground side unit 10 to the vehicle side unit 20. The timing chart of FIG. 4 corresponds to a case in which the power transmission from the ground side unit 10 to the vehicle side unit 20 is suspended when such power transmission is being carried out. The timing chart of FIG. 5 corresponds to a case in which the power transmission from the ground side unit 10 to the vehicle side unit 20 is prevented when such power transmission is to be started.

In FIG. 4, the ratio P2/P1 of the reflected power P2 with respect to the output power P1 rapidly increases after the time point t10. The power source side controller 14 monitors the ratio P2/P1. When the ratio P2/P1 becomes greater than or equal to a predetermined threshold value (at the time point t11 in FIG. 11), the power source side controller 14 determines that the power transmission from the ground side unit 10 to the vehicle side unit 20 is prevented. The power source side controller 14 then outputs the power source ON/OFF signal of the low level to the high frequency power source 13. That is, the power source side controller 14 outputs the power source OFF command to the high frequency power source 13. This turns off the high frequency power source 13. The threshold value of the ratio P2/P1 is set to, for example, approximately 0.8 (80%).

When the power transmission from the ground side unit 10 to the vehicle side unit 20 is being carried out, such power transmission can be interrupted, for example, for the reasons below. That is, the reasons include not only the object 100 that has reached the space between the primary side resonance coil 11 and the secondary side resonance coil 21, as illustrated in FIG. 6, but also, for example, change of the relative positions of the primary side resonance coil 11 and the secondary side resonance coil 21 at the time when the power transmission is being carried out.

In FIG. 5, the ratio P2/P1 rapidly increases since the time point t1, at which the power transmission is started. When the ratio P2/P1 becomes greater than or equal to the predetermined threshold value (at the time point t20), the power source side controller 14 determines the normal transmission of the power from the ground side unit 10 to the vehicle side unit 20 cannot be carried out. The power source side controller 14 then sends the power source ON/OFF signal of the low level to the high frequency power source 13. In other words, the power source side controller 14 outputs a power source OFF command to the high frequency power source 13. This turns off the high frequency power source 13.

When the transmission of the power from the ground side unit 10 to the vehicle side unit 20 is to be started, such power transmission can be prevented, for example, for the reasons below. The reasons include not only the object 100 located between the primary side resonance coil 11 and the secondary side resonance coil 21, but also the absence of the secondary side resonance coil 21, the distance L between the primary side resonance coil 11 and the secondary side resonance coil 21 being greater than 4a-redetermined acceptable value, and the resonance frequencies of the primary side resonance coil 11 and the secondary side resonance coil 21 being different from each other.

A method of setting the threshold value of the ratio P2/P1 of the present embodiment will hereafter be explained.

The ratio P2/P1 may increase in cases other than the case in which an object is located between the primary side resonance coil 11 and the secondary side resonance coil 21. For example, the ratio P2/P1 changes also when the state of the load (for example, the charging amount of the battery 25) changes. However, it is preferable that the transmission of the power be continued even when the state of the load changes.

Specifically, the ratio P2/P1 at the time when the state of the load is changed depending on, for example, the charging state of the battery 25 is greater than the ratio P2/P1 at the time when an object is located between the primary side resonance coil 11 and the secondary side resonance coil 21. From this point of view, in the present invention, the threshold value is set to a value greater than the P2/21 at the time when the state of the load is changed.

In this manner, the case in which the object is located between the primary side resonance coil 11 and the secondary side resonance coil 21 is distinguished from the case in which the state of the load is changed.

The ratio 22/P1 in the case in which the state of the load is changed is approximately 0.1 (10%) and sufficiently smaller than the ratio P2/P1 in a case (which is, for example, the case in which the object is located between the primary side resonance coil 11 and the secondary side resonance coil 21) other than the case in which the state of the load is changed.

The present invention has the following advantages.

(1) The resonance type non-contact charging apparatus has the power source side controller 14 serving as a power ratio detecting section and a stop control section, in addition to the high frequency power source 13, the primary side resonance coil 11, the secondary side resonance coil 21, and the charger 24. The power source side controller 14 detects the ratio P2/P1 of the reflected power P2 with respect to the output power P1 and stops the high frequency power source 13 when the ratio P2/P1 becomes greater than or equal to the threshold value. This prevents the high frequency power source 13 from being damaged by the reflected power P2.

(2) The high frequency power source 13 and the primary side resonance coil 11 are installed at the ground side and the secondary side resonance coil 21 and the charger 24 are mounted in the vehicle, which is preferable in terms of actual use.

The present invention is not restricted to the above-described embodiment but may be embodied in the following forms.

Although the resonance type non-contact charging apparatus is used in a hybrid vehicle, the apparatus may be employed in a vehicle other than the hybrid vehicle.

The primary side resonance coil 11 and the secondary side resonance coil 21 are not restricted to the power cables wound in the helical shapes but may be shaped by winding a power cable in a spiral shape on a plane. This shortens the axial length of each coil and decreases the depth of a hole to be formed at the ground side.

The outlines of the primary side resonance coil 11, the primary coil 12, the secondary side resonance coil 21, and the secondary coil 22 are not restricted to circular shapes but may be polygonal shapes such as a rectangular shape, a hexagonal shape, and a triangular shape, or oval shapes.

The capacitors C, which are connected to the primary side resonance coil 11 and the secondary side resonance coil 21, may be omitted. However, compared to a case without the capacitors C, lower resonance frequencies are obtained in the case with the capacitors C. Further, if the resonance frequencies are the same, the primary side resonance coil 11 and the secondary side resonance coil 21 are reduced in size in the case with the capacitors C compared to the case without the capacitors C.

What is claimed:

1. A resonance type non-contact electrical power feeding apparatus comprising:
   a primary LC resonator that receives a power from a power source;
   a secondary LC resonator arranged separated from and in a non-contact manner with respect to the primary LC resonator, the secondary LC resonator receiving a power from the primary LC resonator through magnetic field;
   a charger that receives the power from the secondary LC resonator;
   a detecting section that detects a reflected power from the primary LC resonator to the power source; and a control section that stops the power source when the value related to reflected power detected by the detecting section reaches greater than or equal to a predetermined threshold value, wherein the primary LC resonator and the secondary LC resonator each includes an inductor and a capacitor, and wherein the value related to reflected power is a ratio of a reflected power from the primary LC resonator to the power source with respect to an output power from the power source to the primary LC resonator.

2. The apparatus according to claim 1, wherein a battery is connected to the charger, and wherein the threshold value is set to a value greater than the ratio at the time when the ratio is changed by change of a charging amount of the battery.

3. A resonance type non-contact electric power feeding apparatus comprising:

a primary LC resonator that receives a power from a power source;

a secondary LC resonator arranged separated from and in a non-contact manner with respect to the primary LC resonator, the secondary LC resonator receiving a power from the primary LC resonator through magnetic field;

a charger that receives the power from the secondary LC resonator;

a detecting section that detects a reflected power from the primary LC resonator to the power source; and a control section that stops the power source when the value related to reflected power detected by the detecting section reaches greater than or equal to a predetermined threshold value, wherein the value related to reflected power is a ratio of a reflected power from the primary LC resonator to the power source with respect to an output power from the power source to the primary LC resonator.

4. The apparatus according to claim 3, wherein the power source and the primary LC resonator are installed at a ground side, and the secondary LC resonator and the charger are mounted in a vehicle.

5. The apparatus according to claim 3, wherein the vehicle is a hybrid vehicle.

* * * * *